Dec. 27, 1966  D. A. MORETON  3,293,997
CONTAINERS, SUCH AS BOXES, CARTONS AND CUPS
Filed Dec. 19, 1963  7 Sheets-Sheet 3
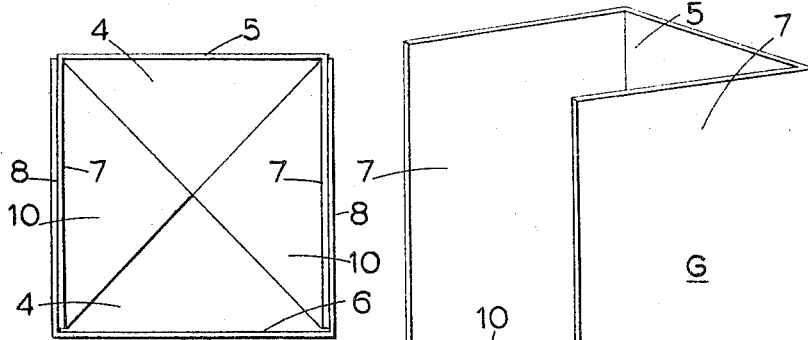
FIG. 4.
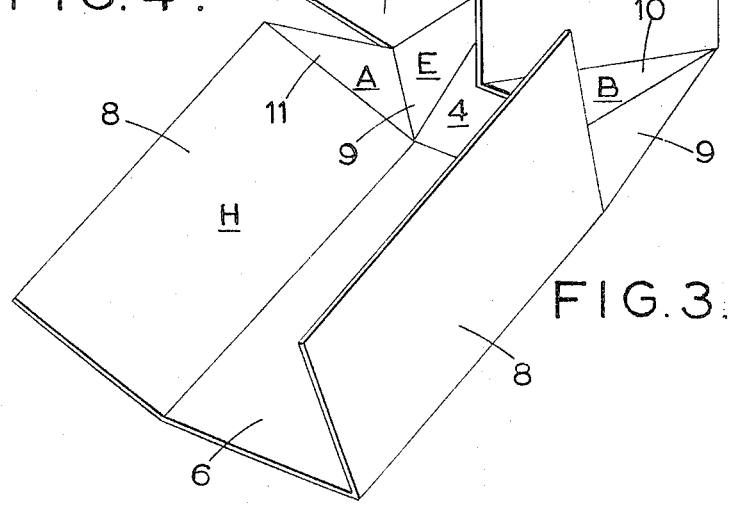
FIG. 3.
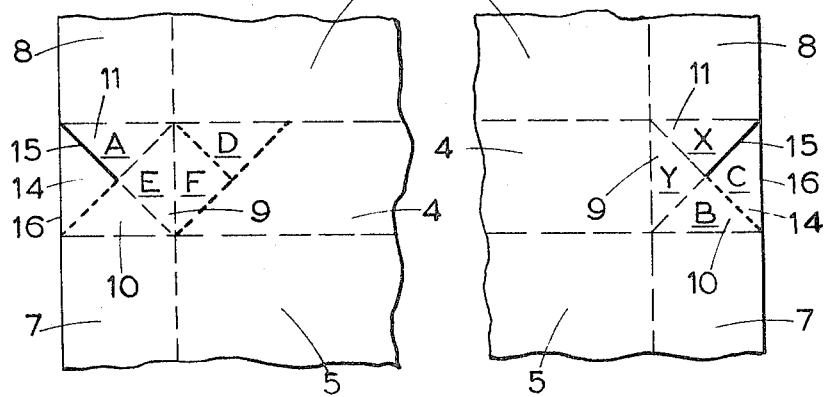
FIG. 5.   FIG. 6.

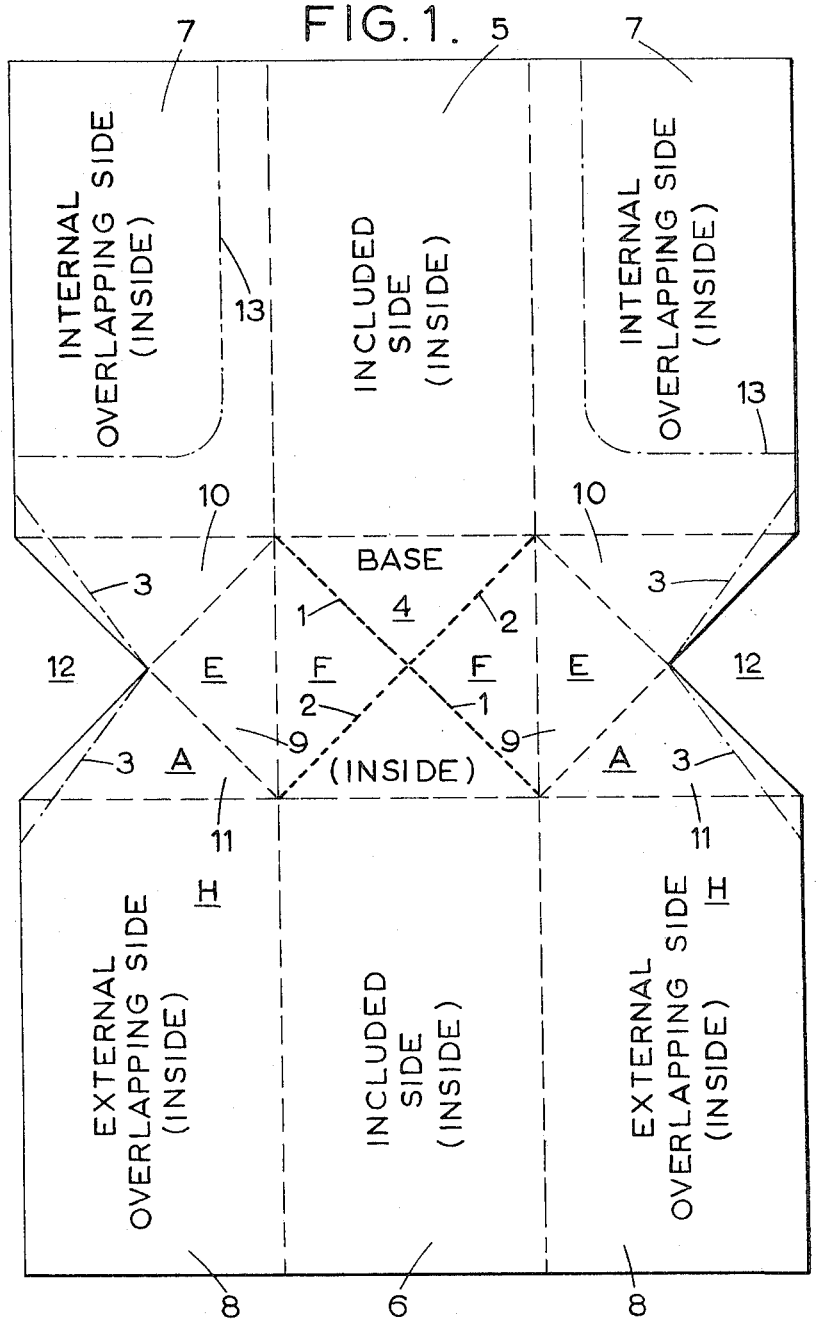

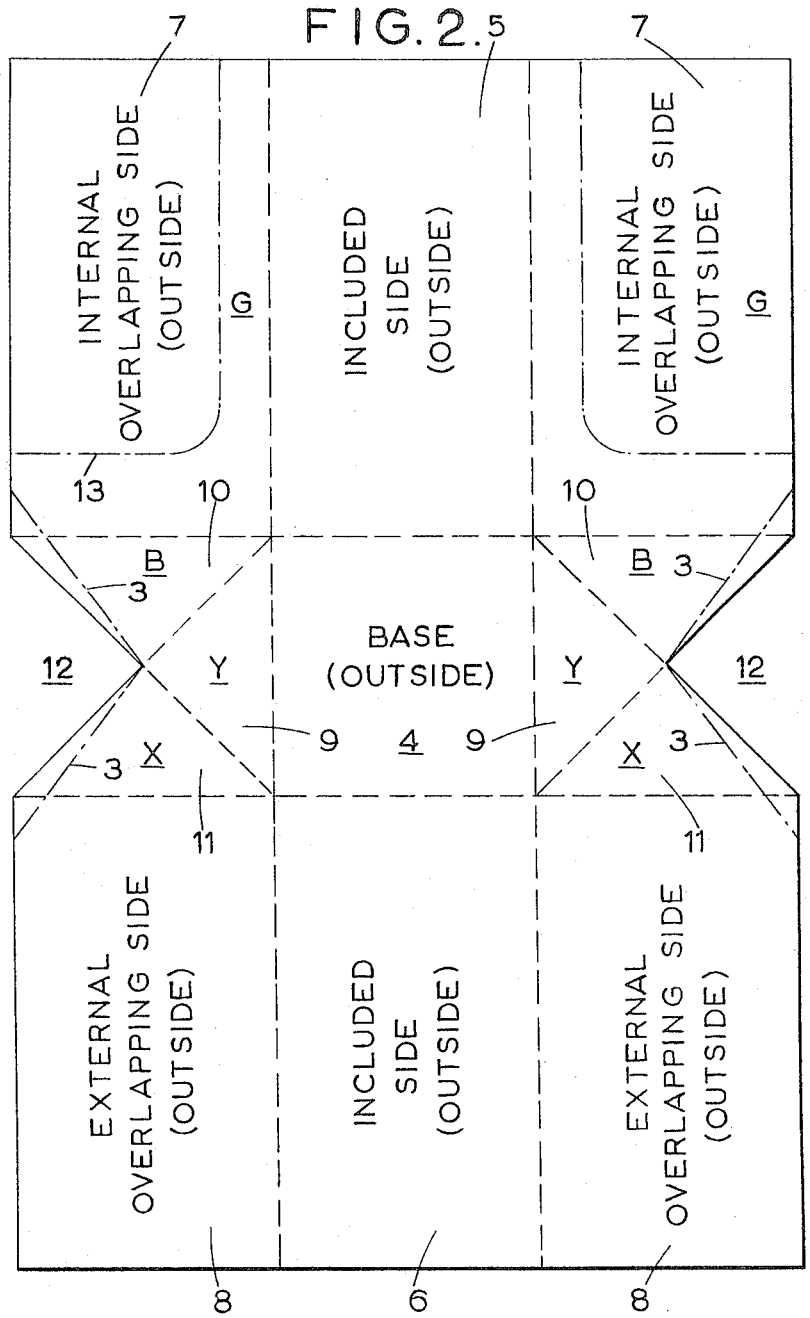

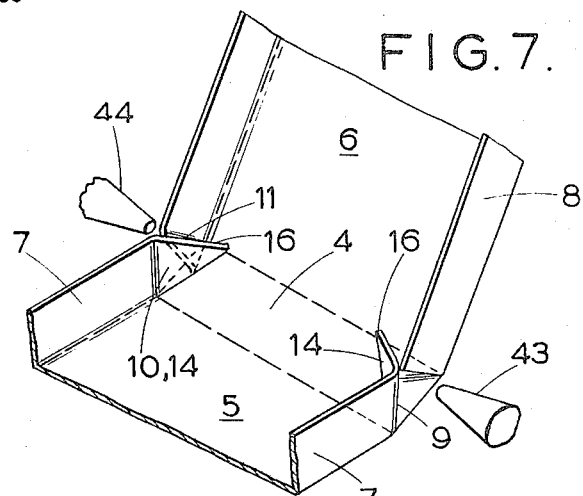
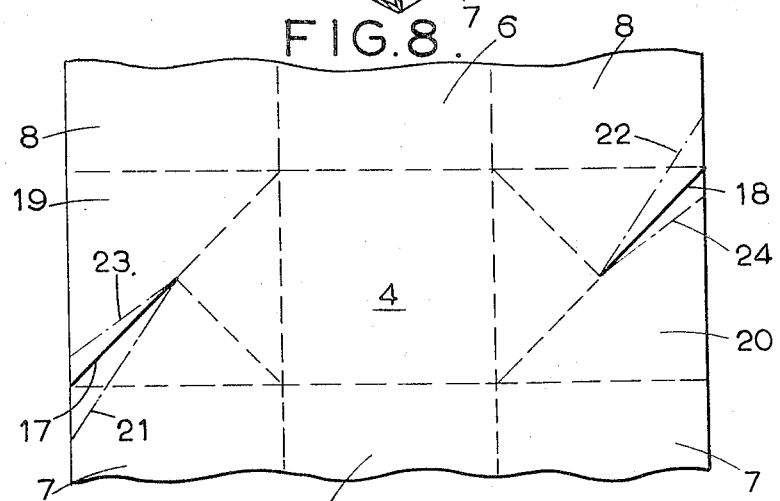
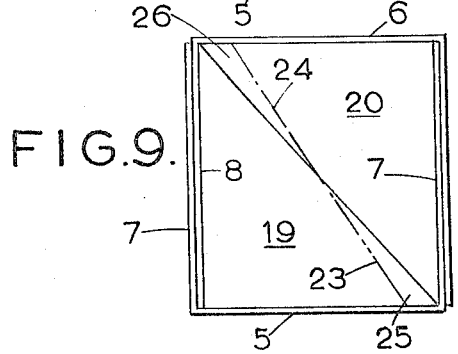

Dec. 27, 1966 D. A. MORETON 3,293,997
CONTAINERS, SUCH AS BOXES, CARTONS AND CUPS
Filed Dec. 19, 1963 7 Sheets-Sheet 5
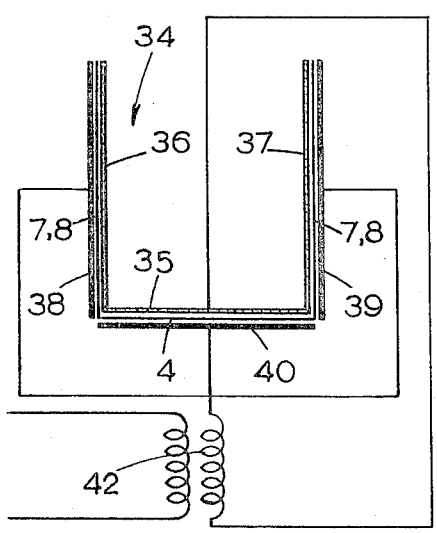
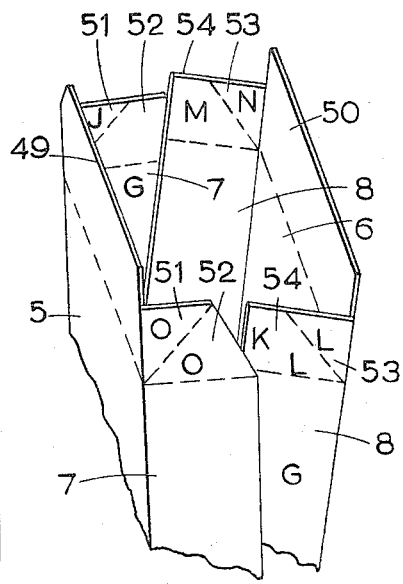
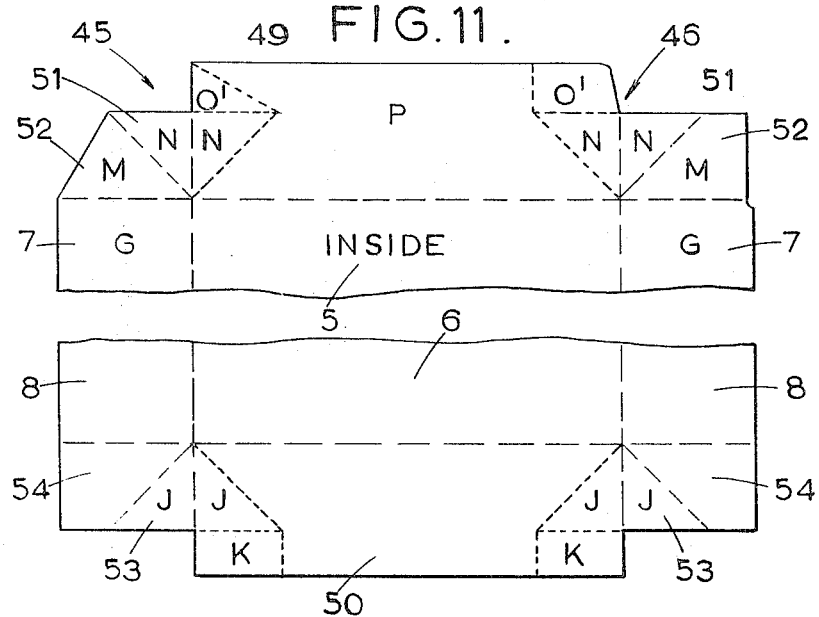

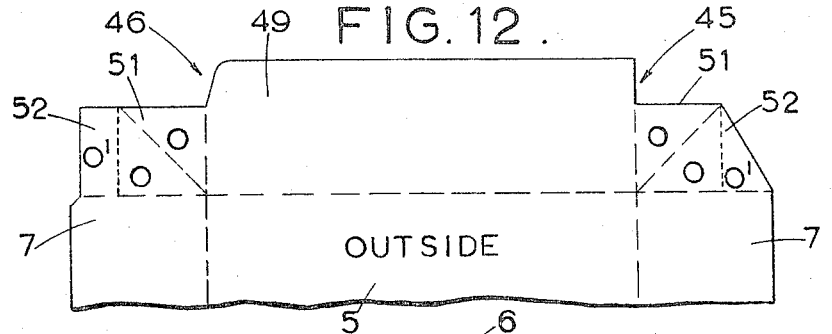
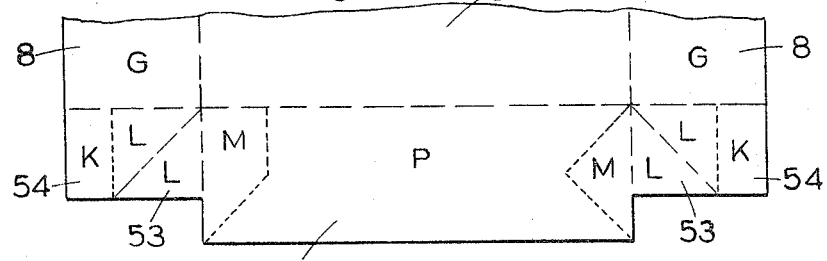
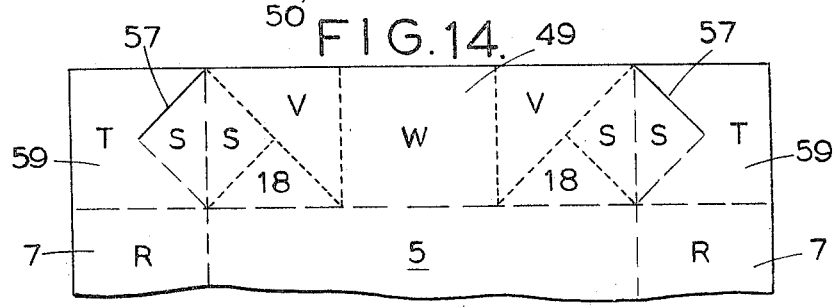
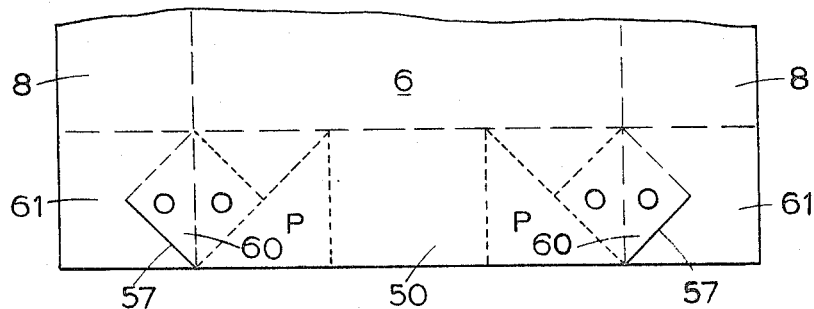

Dec. 27, 1966  D. A. MORETON  3,293,997
CONTAINERS, SUCH AS BOXES, CARTONS AND CUPS
Filed Dec. 19, 1963  7 Sheets-Sheet 7
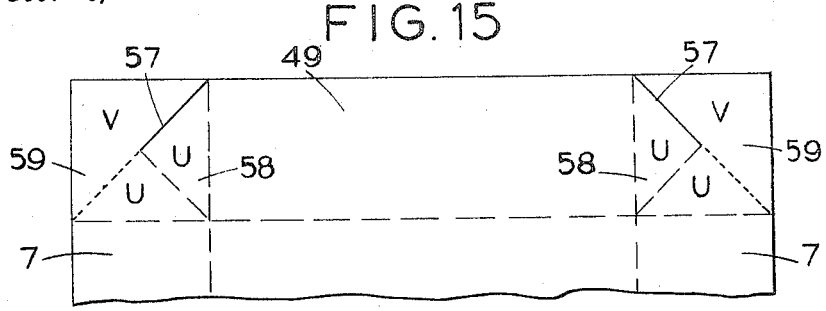
FIG. 15
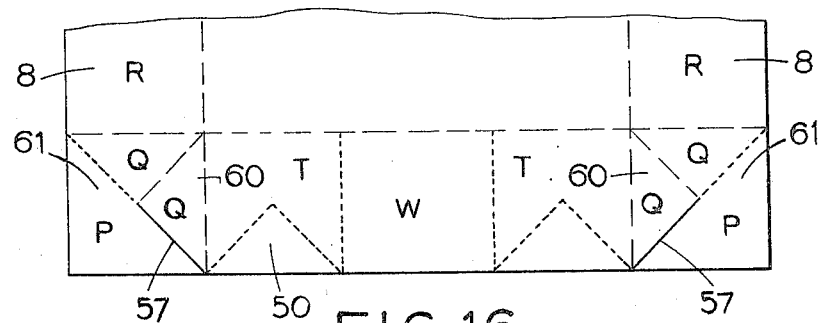
FIG. 16.
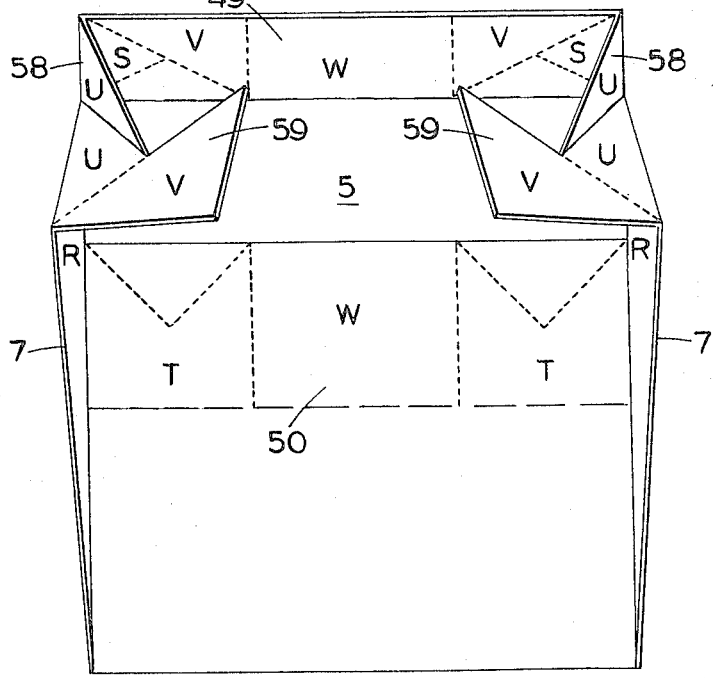

United States Patent Office 3,293,997
Patented Dec. 27, 1966

3,293,997
CONTAINERS, SUCH AS BOXES, CARTONS
AND CUPS
Douglas Arthur Moreton, Derby, England, assignor to
Bemrose & Sons Limited, Derby, England
Filed Dec. 19, 1963, Ser. No. 331,880
Claims priority, application Great Britain, Jan. 2, 1963,
291/63; Feb. 1, 1963, 4,336/63
9 Claims. (Cl. 93—36)

This invention relates to containers, such as cartons, boxes or cups, made from blanks of paper, paperboard, cardboard, plastic material, or other foldable material, and to methods of forming such containers.

In the specification of our patent application No. 280,022, now Patent No. 3,193,175, a number of containers are described which are formed from single blanks and which have advantageous properties, such as having all or some of the corners free from pin-holes, being capable in some cases of being formed from blanks cut out from web or sheet without any consequential waste material whatsoever, and being capable of being held in shape, or closed, entirely by heat-sealing methods. These containers are primarily for use in frozen food packs and the present invention is also concerned with such packs, but the invention is also readily applicable to cartons for milk, slush fruits, dehydrated foods, accelerated freeze dried foods, pulverulent materials, oils and other liquids or viscous fluids, and, in particular, drinking cups for cold or hot drinks.

An important object of the invention is to provide effective means for sealing the joints, corners and folds in the aforesaid containers. Such means, in the case of sealed cartons, providing a reliable barrier against the passage of moisture-vapour, gas, odour, and biological invasion of the contents.

Another object of the invention is to provide rapid means for heat-sealing containers before the contents have been inserted, so that there is no risk of the contents being damaged as a result of the heat-sealing process. A further object is to avoid the necessity for passing all the heat through the container walls, thereby avoiding delay in the sealing process, permitting close temperature control, and eliminating the fire risk that arises when the process is arrested, as a result of a fault, with heaters in contact with or in proximity to the container walls.

According to the invention, a method of forming a container having opposed sides, each included between two overlapping sides, a base integral with the included sides, and two sets of three triangular gussets, the gussets in each set having coincident apices, their adjacent edges integral with one another, and their bases integral with adjacent edges of two overlapping sides and of the container base, includes folding a blank, either selectively or wholly coated on one or both faces with an adhesive that becomes effective under heat and pressure, or is itself made of a thermo-plastic material, so that the two sides in each pair of overlapping sides overlap one another and the gussets in each set thereof form a triangular back, and applying heat and pressure to cause the two sides in each pair of overlapping sides to stick together and each pack of triangular gussets to form a fluid-tight seal at the base. The heating may advantageously be applied by electrical high frequency heating and in order to enable this process to be effective, the blank must have a high dielectric loss factor to enable the heat to be generated quickly within the material of the blank itself, and where the blank has an adhesive coating, conducted immediately from the blank to the coating. However, when the blank is made of a thermo-plastic material having a comparatively low dielectric loss factor, the heat may be applied by conduction while the folded blank contains either a former or the contents.

The blanks preferably have the features of those described in the aforesaid specification. That is to say, such a blank is creased, scored or otherwise weakened along lines arranged to enable the closed end to be formed from the back panel or base located between the two included sides, the base and overlapping sides on each side being joined by the three triangular gussets which, in the formed carton, lie face to face in a pack against the base. In the case of a carton, the two said included sides may constitute the top panel of the lid and the base panel of the tray, with the other sides overlapping at each side. In the case of a container such as a cup or milk carton, the container stands on the back panel or base, which may be square or nearly square. If required, the sides may be arranged so that they flare outwards towards the top or change from a square or rectangular cross-section to a circular or elliptical plan.

Each set of three gussets approach one another to form a three sided intaglio pyramid at one point in the folding of the blank into the shape of the container. A particular feature of the invention, therefore, consists in projecting by way of a jet or spray, into the apex of each pyramid, a heated thermo-plastic sealing medium such as wax, wax-blend or other hot-melt composition. This assists in the sealing of the container, particularly by closing the tiny pin-hole at the apex of the pyramid.

Where the method is applied to the formation of a carton, a blank having closure extensions at its ends is made use of, and the closure extensions may be folded over one another to provide a closed carton, heat and pressure thereupon being applied to the closure extensions to seal them. The closure extensions may consist of flaps extending from the included sides, and four pairs of gussets, the gussets in each pair having adjacent edges integral with one another and two edges respectively integral with an adjacent edge of one of the flaps and with an adjacent edge of one of the overlapping sides.

In order that the invention may be clearly understood and readily carried into effect a variety of containers, and methods of forming such containers, will now be described, by way of example, with reference to the accompany drawings, in which:

FIGURES 1 and 2 are plans showing opposite faces of a blank from which a container may be formed, FIGURE 3 is a perspective view showing a stage in the formation of a container from the blank of FIGURES 1 and 2, FIGURE 4 is an end view of a container made from the blank of FIGURES 1 and 2, FIGURES 5 and 6 are plans showing opposite faces of a portion of a second blank, FIGURE 7 is a perspective view of a portion of a container formed from the blank of FIGURES 5 and 6, FIGURE 8 is a plan of a portion of a third blank, FIGURE 9 is an end view of a container formed from the blank of FIGURE 8, FIGURE 10 is a circuit diagram;

FIGURES 11 and 12 are plans showing opposite faces of the ends of a fourth blank;

FIGURE 13 is a perspective view showing a stage in the formation of a carton from the blank of FIGURES 11 and 12;

FIGURES 14 and 15 are plans showing opposite faces of the ends of a fifth blank; and FIGURE 16 is a front view showing a stage in the formation of a carton from the blank of FIGURES 14 and 15.

The blank shown in FIGURES 1 and 2 is creased along the broken lines to enable it to be folded along those lines. The dotted lines 1, 2 and the chain lines 3 are described below. It will be seen that the broken lines define a square 4 which constitutes the base of the container and from opposite edges of which extend rectangles 5, 6 that are to constitute opposite sides of the container. The rectangle 5 is included between marginal rectangles 7 which in the erected container lie at right angles to the rectangle 5. Similary the rectangle 6 is included between marginal rectangles 8 which lie at right angles to the included rectangle 6, and overlap the marginal rectangles 7, in the erected container. Thus, each pair of marginal rectangles 7, 8 constitute overlapping sides.

The base 4 and the marginal rectangles 7, 8 define two square areas, each containing three continuous gussets 9, 10, 11, having coincident apices, the remainder of each such area being constituted by a triangular notch 12. The gussets in each set 9, 10, 11 thereof have their adjacent edges integral with one another and their bases integral with adjacent edges of two overlapping sides 7, 8 and of the base 4. When the container is formed, each set of three gussets 9, 10, 11 is folded together in a triangular pack, with the inside face E (FIGURE 1) of the gusset 9 against one of two triangular faces F on the base 4, indicated by the imaginary, intersecting dotted lines 1, 2. The gusset 11 lies on the gusset 9 and the gusset 10 on the gusset 9, with the outside face B (FIGURE 2) of the gusset 10 against the inside face A (FIGURE 1) of the gusset 11.

Now supposing the inside surface (FIGURE 1) of the blank is coated with an adhesive that becomes effective under heat and pressure and, supposing also that the container is formed around a solid former enabling the required heat and pressure to be applied for the required time, then on each side of the container, the face A (gusset 11) sticks to the face B (gusset 10) and the face E (gusset 9) sticks to the face F (base 4), and, in addition, the inside face H of the marginal rectangle 8, constituting the external overlapping side, sticks to the outside face G of the marginal rectangle 7, constituting the internal overlapping side. Furthermore, if the outside surface (FIGURE 2) of the blank is coated either wholly or selectively with a suitable adhesive, the outside faces X and Y (FIGURE 2) of the gussets 9, 11, on each side of the container, stick together on the application of heat and pressure.

When the blank is made of paper or paperboard, the thermo-plastic coating may consist of polyethylene, polypropylene, polyvinylidene chloride or its copolymers, wax or wax blends, or wax and resinous blends incorporating a copolymer of ethylene and vinyl acetate in suitable proportions. When an overall or selective application of adhesive is applied to the outside surface (FIGURE 2) of the blank, as indicated above in respect of the faces X, Y of the gussets 9, 11, the adhesive may take the form of any hot-melt adhesive that is compatible with the coating on the inside surface (FIGURE 1) of the blank.

One method of applying the necessary heat and pressure will now be described with reference to FIGURE 10. This method makes use of electrical heating by high frequency induction and the former 34, on which the container is formed, is made to function as one of the electrodes. This former has a horizontal base 35 integral with vertical members 36, 37. It is of metal and may also have side panels against which the two included sides 5, 6 respectively lie. Further electrodes 38, 39, 40, which in operation are of opposite polarity to the one inside, are then applied against the outside of each pair of overlapping side rectangles 7, 8 and against the outside of the base 4. High frequency current is applied to the electrodes through a transformer 41 and conductors 42 with the result that heat is generated in the paper or paperboard, which constitutes a dielectric between the inside and outside electrodes. This heat is transferred to the inside adhesive coating and a positive bond is thereby effected. The bond is preferably completed by the application of pressure, between the inside electrodes 35, 36, 37 and the outside electrodes 38, 39, 40 while the high frequency supply is disconnected. Most of the thermoplastic adhesives specified above have low dielectric loss factors, but polyvinylidine chloride and its copolymers have higher dielectric loss factors, so that in this case, there is substantial dielectric heating the coating itself as well as in the paper or paperboard. Even in the case of adhesives having low dielectric loss factors, very swift seals can be made because the heat is generated in the paper or paperboard itself and only has to travel a minute distance to render the thermoplastic coating viscous.

In an alternative, no paper nor paperboard is used but the container is made from a blank consisting of a thermoplastic material such as polyethylene, polypropylene, polyvinyl chloride, polystryene, expanded polystyrene, polyvinylidene chloride and its copolymers. Containers made wholly from polyvinyl chloride, polyvinylidene chloride or its copolymers can be sealed by the high frequency method described above, but the other thermoplastic materials require different heating methods because there is no paper or paper-board in which dielectric heating can take place rapidly.

The container described with reference to FIGURES 1 to 4 may constitute part of a carton, in which case the side edges remote from the base 4 would be formed with flaps and margins arranged to be folded over to close the carton. On the other hand, the container as it stands may constitute a simple receptacle such as a drinking cup or a container for milk or other liquid closed by a press in top, or other closure. In the case of the carton, the included sides 5, 6 would be made substantially wider than shown in the drawings and the base correspondingly oblong. In the case of the drinking cup, the sides may be somewhat deeper than shown and the creases between the rectangles 5, 7 and between the rectangles 6, 8 may terminate well short of the free edges so that the top of the cup becomes circular or, in the case of an oblong base, elliptical. Furthermore, a cup having sides that flare outwards towards the top may be made by altering the relative positions of the various creases represented by the broken lines.

In order to avoid friction or binding between portions of the blank while it is being folded into the container, it is advantageous to make each notch 12 somewhat wider than shown by the full outline (FIGURES 1 and 2). Thus, one or both sides of each notch may be flared to the extent such as indicated by the chain lines 3.

The blanks shown in FIGURES 1 and 2 are symmetrical above and below the apices of the notches 12 so that, in practice, it makes no difference whether the rectangles 7 are folded inside or outside the rectangles 8, the rectangles 7 only having been regarded as the internal overlapping sides as a matter of convenience. If, however, the rectangles 7 are cut away, for example along the chain lines 13, these sides should be the internal ones, for the sake of neatness, although it is also possible for them to be the outside ones. Furthermore, if one or each of the rectangles 7 is only partially cut along a line, such as 13, a portion is provided that can be bent outwards to form a handle.

Referring now to FIGURES 5 to 7, it will be seen that these show a method of forming a carton in which the base 4 is no longer square but is considerably elongated. Moreover, the external overlapping sides 8 and the included side 6 are shown at the top because these would usually constitute the major portion of the lid of the carton, while the internal overlapping sides 7 and the included side 5 would constitute the major portion of the tray. However, the important feature of FIGURES 5 to 7 consists in the provision on the gusset 10 of an extension 14 which fills in the notch 12 of FIGURES 1 and 2, it being understood that dotted lines in FIGURES 5 and 6 merely indicate imaginary lines. A simple slit 15 divides the extension 14 from the gusset 11. The carton may be constructed, erected, and sealed in the way described above with reference to FIGURES 1 to 4, with the important additional feature that the outside face C of the extension 14 is bonded to the inside triangular area D of the base 4. However as, in the folded condition, the gusset 11 lies over the gusset 9, and the gusset 10 lies over the gusset 11, it is desirable for the extension 14 to be embossed or depressed relatively to the gusset 10 so as to enable the face C to make firm contact with the area D. In this instance, therefore, the dotted line between the gusset 10 and extension 14 may be regarded as indicating the location of the line along which the extension 14 is depressed relatively to the gusset 10. The aforesaid former is shaped to match this depression.

In the folded condition, the outside edge 16 of the extension 14 lies in the angle between the base 4 and included side 6, thereby giving increased strength to the carton.

It will be appreciated, particularly from FIGURE 7, that during the folding of the containers described above, the three gussets 9, 10, 11 on each side pass through a position in which they form an intaglio, three-sided pyramid. It is, therefore, advantageous to project from heated nozzles 43, 44 by way of a jet or spray into the apex of each such pyramid a heated thermoplastic sealing medium such as wax, wax-blend or other hot-melt composition. As the folding of the container by machine is done extremely quickly, the medium remains molten or semi-molten until the final high-frequency bonding of the container begins. This procedure not only closes the very small pin hole at the apex of the pyramid, but also eliminates the necessity for providing the blank initially with any outside adhesive coating for sealing the faces X, Y of the gussets 11, 9. The hot-melt composition must, of course, be compatible with the surfaces it is to seal and a range is commercially available. Some are based on comparatively low molecular weight plastics such as polyethylene, polyvinyl acetate, ethylene and vinyl acetate copolymers. Such synthetic plastics may be provided with or without extenders or modifiers.

The slits 15 on opposite sides of the blank, one face of which is shown in FIGURES 5 and 6, are at right angles to one another or nearly at right angles to one another. This is necessary to enable the rectangles 8 to lie outside the rectangles 7 in the formed carton. However, in the case of a container having a square, or nearly square, base 4, the two triangular extensions 14 will overlap. To avoid this, it is desirable to form the slits parallel to one another, or nearly parallel to one another, as shown at 17, 18 in FIGURE 8. Then the two triangles 19, 20, each comprising a gusset equivalent to the gusset 10 (FIGURES 5 and 6) and an extension equivalent to the extension 14, lie in complementary positions, as shown in FIGURE 9, in the erected container. However, on one side the rectangle 7 lies outside the rectangle 8 and, on the other side, inside the rectangle 8.

Just in the same way as the notch 12 (FIGURES 1 and 2) can be cut back along one or both of the chain lines 3 to facilitate the folding operation, so the slits 15, 17, 18 in FIGURES 5 to 8 can be displaced, for the same purpose. Thus, referring to FIGURE 8, slits may be cut along the chain lines 21, 22 and the waste material between each pair of slits 17, 21, and 18, 22 removed. To facilitate such removal, slits may be cut along the chain lines 23, 24 instead of along the lines 17, 18. Then, in the formed container (FIGURE 9), narrow angular gaps 25, 26 appear between the triangles 19, 20. It may be noted that no waste material at all need be removed if slits are only made along the chain lines 21, 22 and the base 4 is made slightly oblong to accommodate the enlarged triangles.

It is to be understood that containers such as that described with reference to FIGURES 8 and 9 may be formed with circular or elliptical tops, or flared sides, or one or two handles, as described above with reference to FIGURES 1 to 4.

The corners, designated generally by the reference numerals 45, 46 that appear uppermost on the blank of FIGURES 11 and 12 are alternative. Normally the blank would have both these corners the same.

The included sides 5, 6 are respectively extended by margins or flaps 49, 50. Each side of the flap 49 is joined to the adjacent overlapping side 7 by a pair of gussets 51, 52. The gusset 51 is triangular and the gusset 52 may either be triangular as shown at the corner 45 or quadrilateral as shown at the corner 46. Similarly each side of the flap 50 is joined to the adjacent overlapping side 8 by a triangular gusset 53 and a quadrilateral gusset 54.

The inside face of the blank (FIGURE 11) is coated with an adhesive which as aforesaid may be a thermoplastic adhesive such as polyethylene, polypropylene, polyvinylidene chloride or its copolymers, wax or wax blends, or wax and resinous blends incorporating a copolymer of ethylene and vinyl acetate in suitable proportions. The outside face (FIGURE 12) of the blank may also be coated with adhesive. As in the foregoing examples, the blank may be made of paperboard, or alternatively, the blank itself may be made of a theromplastic material, in which case, the adhesive is, of course, unnecessary.

In folding the blank to the shape of the carton two alternative procedures are available, according to whether end filling or top filling is employed. For end filling the overlapping sides 7 and gussets 51, 52 are folded at right angles to the included side 5 and flap 49 (FIGURE 3) and the overlapping sides 8 and gussets 53, 54 are folded at right angles to the included side 6 and flap 50; also the base folding is effected so that the process passes through the phase shown in FIGURE 3 to the state in which the overlapping side 7 on each side is completely overlapping the overlapping side 8. This folding is effected, as described above with reference to FIGURE 10 about a former, and the joints at the base and overlapping sides made secure by induction heating and pressure. The former is then removed and the carton is filled and closed by folding the front flaps and gussets in the way described below. For top filling the tray defined by the sides 6, 8 and flaps 50 is first completed and filled and then the lid defined by the sides 5, 7 and flap 49 is completed and folded over the tray. In this case also the method of FIGURE 10 may be adapted to making secure the joints of the lid and tray by induction heating and pressure, prior to filling the tray.

The front of the lid is completed by folding the flap 49 at right angles to the included sides while each gusset 9 is folded inwards so that its inner face N (FIGURE 11) engages the adjacent area N on the inner face of the flap 49. In this connection it is to be noted that, in FIGURES 11 and 12, the dotted lines merely represent outlines and no physical feature. The folding of the flap 49 also involves the folding of each gusset 52 so that its outer face O (FIGURE 12) engages the outer face O of the gusset 5, while the additional areas O of the gussets 52 engage the areas O inside the flap 49. Similarly the folding of the flap 50 at right angles to the included side 6 results in the inner face J (FIGURE 11) of each gusset 53 engaging the area J of the inner face of the flap 50, and the area L (FIGURE 12) on the outer face of each gusset 54 engaging the outer face L of the adjacent gusset 53. Finally, when the lid is closed over the tray, the faces M (FIGURE 11) on the inside of the gussets 52 face the areas M (FIGURE 12) on the outside of the flap 50. The remaining area P (FIGURE 12) on the outside of the flap 50 engages the area P (FIGURE 11) inside the flap 49. Moreover, the areas K (FIGURE 12) on the outside faces of the gussets 54 face the areas 55 (FIGURE 11) on the inside face of the flap 50.

In the case where the inner face (FIGURE 11) of the blank is coated with adhesive, superimposed faces may be sealed to one another by the application of heat and pressure when a coated face touches a paperboard face, or where two coated faces contact. Thus the contacting faces J may be sealed together, or the contacting faces K but not the contacting faces L, nor the contacting faces O. However, if the blank is externally coated, all pairs of contacting faces may be sealed together. In any event, after filling, the faces G (FIGURE 11) inside the overlapping sides 7 are sealed to the faces G (FIGURE 12) outside the overlapping sides 8, also the engaging pairs of faces, M, N, P, are sealed together.

It will be appreciated that a considerable amount of variation is possible in the shapes of the gussets 9, 10, 11, 12. For example, each pair of gussets 9, 10 or 11, 12 may be arranged substantially completely to fill the rectangular space bounded on two sides by the adjacent edges of the flap 49 or 50 and overlapping side 7 or 8. Such an arrangement is very suitable for end filling.

Referring now to the construction of FIGURES 14 to 16, it will be seen that the initial blank has simple rectangular ends formed with slits 57 as well, of course, as the creases represented by the broken lines. Then if the centre (not shown) of the blank is joined to the overlapping sides 7, 8 by gussets arranged, as shown in FIGURES 5 to 7, so as to involve no notches in the edges of the blank, the entire blank consists of a rectangular sheet that can be cut from a web or sheet of paperboard without any waste. On each side of the lid flap 49, the slit 57 divides one edge of a triangular gusset 58 from one edge of a five-sided tab 59. Similarly on each side of the tray flap 50, the slit 57 divides one edge of a triangular gusset 60 from a five-sided tab 61.

The carton is designed for top filling so that the tray is formed first and this involves folding the margins 8 and flap 50 at right angles to the base panel 6 while, on each side, the inner face O (FIGURE 14) of the gusset 60 engages the adjacent area O on the inner face of the flap 50, the outer area Q (FIGURE 15) of the tab 61 engages the outer face Q of the gusset 20, and the outer area P of the tab 61 engages the inner area P (FIGURE 14) of the flap 50. Assuming that the blank is coated only on its inner face with an adhesive, the pairs of engaging areas O and P are sealed together. The tray is now filled and the lid is then brought down while being formed. FIGURE 14 shows a front view of the formed tray with the lid in one phase of its formation and closing. When the flap 49 and overlapping sides 7 are bent at right angles to the included sides 5, on each side the inner face S of the gusset 58 engages the adjacent area S on the inner face of the flap 49, the outer area U (FIGURE 14) of the tab 59 engages the outer face Q of the gusset 58, and outer area V of the tab 59 engages the inner area V (FIGURE 14) of the flap 49. When the carton is closed, the inner faces T of the tabs 59 and the inner area W of the flap 49 engage the outer areas T, W, T on the outer face of the flap 50. Finally the engaging pairs of faces R, S, T, V, and W are sealed together by heat and pressure. Alternatively the areas W need not be sealed together and so an easy means of entry to the cartons is thus provided.

I claim:

1. A method of forming a container including the steps of folding an initially flat sheet free from folds and having a thermo-plastic surface about a former into a container configuration comprising two opposed pairs of overlapping sides, two opposed sides included between said pairs of overlapping sides, a base integral at its opposite edges with said included sides, and two packs of triangular gussets having pointed apices and lying flat against the base, the gussets in each pack including a gusset integral laterally with the other two gussets and at its base with an edge of said container base, said other two gussets being integral with adjacent edges of the adjacent overlapping sides, and the apices of said gussets being coincident, and applying heat and pressure to said thermo-plastic surface while supported by said former to cause the two sides in each said pair of overlapping sides to stick together and each pack of triangular gussets to form a fluid-tight seal at said container base.

2. A method according to claim 1, in which the step of applying heat and pressure causes each pack of triangular gussets to stick to the base.

3. A method of forming a container including the steps of folding an initially flat sheet free from folds and having a high dielectric loss factor and a thermo-plastic surface about a former, into a container configuration comprising two opposed pairs of overlapping sides, two opposed sides included between said pairs of overlapping sides, a base integral at its opposite edges with said included sides, and two packs of three congruent, triangular gussets integral with one another and integral respectively with an edge of the base and with edges of one pair of said overlapping sides, applying electrodes to the inside surfaces and outside surfaces of said container and feeding said electrodes with alternating electric current so as to heat said thermo-plastic surface and thereby cause portions of said folded sheet to stick together.

4. A method according to claim 3, in which said electrodes are applied respectively to the inside and outside of each of said pairs of overlapping sides, the outside of said base and upon said packs of gussets, and in which, when said thermo-plastic surface is heated, applying pressure through the medium of said electrodes to cause said overlapping sides to adhere tightly to one another and said packs to adhere to said base.

5. A method of forming a container including the steps of folding an initially flat sheet free from folds and having a thermo-plastic surface about a former, into a container configuration comprising two opposed pairs of overlapping sides, two opposed sides included between said overlapping sides, a base integral at its opposite edges with said included sides, two packs of three congruent triangular gussets integral with one another and integral respectively with an edge of the base and with edges of one pair of said overlapping sides, and closure extensions integral with the edges of said overlapping sides and of said included sides remote from said base, applying heat and pressure to said thermo-plastic surface to cause the two sides in each said pair of overlapping sides to stick together and each pack of triangular gussets to form a fluid tight seal at the container base, removing the container from the former and folding said closure extensions over one another to provide a closed carton, and applying heat and pressure to said closure extensions to seal them together.

6. A method according to claim 5, including folding closure extensions extending from said included sides over one another, and pairs of gussets, respectively interposed between the edges of said closure extensions and the adjacent edges of said overlapping sides, being folded face to face with the face of one of each of said pairs of gussets against said closure extensions, each said pair of gussets being integral with one another edge to edge, and at two other edges integral respectively with one of said closure extensions and one of said overlapping sides.

7. A method of forming a container including the steps of forming an initially flat non-folded rectangular sheet, having a thermo-plastic surface with six slits, two of said slits being at one end of said sheet, respectively spaced close to the edges of said sheet and at right angles to one another, two others of said slits being at the other end of said sheet and respectively spaced close to the edges of said sheet and at right angles to one another, the two remaining slits being disposed at opposite edges of said sheet substantially half way between the ends thereof and parallel respectively to two of the other slits, folding said sheet into a container configuration comprising two opposed pairs of overlapping sides, two opposed sides included between said overlapping sides, a base integral at its opposite edges with said included sides, two packs of three congruent, triangular gussets integral with one another and integral respectively with an edge of said base and with edges of one pair of said overlapping sides, one of said gussets in each said pack having an extension with an edge determined by one of said slits, applying heat and pressure to said thermoplastic surface to cause the two sides in each said pair of overlapping sides to stick together and each pack of triangular gussets to form a fluid-tight seal at said container base, folding the free ends of said included sides over one another to form a closed carton and the corners of said blank inwards to form pairs of closure gussets between said folded ends and said overlapping sides, and applying heat and pressure to said folded ends to seal them together.

8. A method of forming a container including the steps of folding an initially flat non-folded sheet, having a thermo-plastic surface, into a container configuration comprising two opposed pairs of overlapping sides, two opposed sides included between said pairs of overlapping sides, a base integral at its opposite edges with said included sides, and two packs of triangular gussets, the gussets in each pack including a gusset integral laterally with the other two gussets and at its base with an edge of said container base, said other two gussets being integral with adjacent edges of the adjacent overlapping sides, and the apices of said gussets being coincident, the three gussets of each pack forming a three sides intaglio pyramid during the folding of said sheet to said container configuration, projecting a jet of heated thermo-plastic sealing medium into the apex of each said pyramid, and, after the formation of said container configuration, applying heat and pressure to said thermo-plastic surface to cause said two sides in each said pair of overlapping sides to stick together and each pack of triangular gussets to form a fluid-tight seal at said container base.

9. A method according to claim 1, in which said container configuration constitutes a cup and in which a portion of one of said overlapping sides is formed so as to be bent outwards to constitute a handle.

References Cited by the Examiner

UNITED STATES PATENTS

| | | | |
|---|---|---|---|
| 2,097,708 | 11/1937 | Trost | 229—33 X |
| 2,535,413 | 12/1950 | Hart et al. | |
| 2,914,234 | 11/1959 | Hazelwood | 229—31 |
| 3,062,105 | 11/1962 | Oxborrow | 93—51 |
| 3,115,073 | 12/1963 | Kreimendahl | 93—51 |
| 3,202,065 | 8/1965 | Bolcato | 93—39.1 X |

BERNARD STICKNEY, *Primary Examiner.*